United States Patent
Dietz et al.

(10) Patent No.: US 7,836,404 B2
(45) Date of Patent: Nov. 16, 2010

(54) STREAMING INTERNET MEDIA RECORD AND PLAYBACK SOFTWARE PROGRAM

(75) Inventors: Timothy Alan Dietz, Austin, TX (US); Walid Kobrosly, Round Rock, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1534 days.

(21) Appl. No.: 10/015,235

(22) Filed: Dec. 13, 2001

(65) Prior Publication Data
US 2003/0112258 A1 Jun. 19, 2003

(51) Int. Cl.
*G06F 3/048* (2006.01)
(52) U.S. Cl. ............... 715/748; 715/716; 715/968; 707/609
(58) Field of Classification Search ............ 345/716, 345/727, 733, 748; 725/51; 709/219; 715/500.1, 715/716, 748, 968; 707/609
See application file for complete search history.

(56) References Cited

U.S. PATENT DOCUMENTS

| | | | | |
|---|---|---|---|---|
| 6,012,086 A | * | 1/2000 | Lowell | ............. 709/218 |
| 6,715,126 B1 | * | 3/2004 | Chang et al. | ............. 715/500.1 |
| 7,519,911 B2 | * | 4/2009 | Friedman | ............. 715/752 |
| 2002/0198963 A1 | * | 12/2002 | Wu et al. | ............. 709/219 |
| 2003/0033331 A1 | * | 2/2003 | Sena et al. | ............. 707/513 |
| 2003/0169330 A1 | * | 9/2003 | Ben-Shachar et al. | ....... 348/14.09 |

FOREIGN PATENT DOCUMENTS

| WO | WO 01/22682 A2 * | 3/2001 |
|---|---|---|
| WO | WO 01/43322 A2 * | 6/2001 |
| WO | WO 01/50226 A2 * | 7/2001 |

* cited by examiner

*Primary Examiner*—Namitha Pillai
(74) *Attorney, Agent, or Firm*—Yee & Associates, P.C.; Steven L. Bennett (57) ABSTRACT

A method, apparatus, and computer instructions for managing streaming media data. A graphical user interface having a set of controls for use in managing a media data stream is presented. User input is received for use in managing the media data stream in which the user input includes an identification of a source of the media data stream, a start time, and a desired format. The media data stream is requested using the start time and the identification of the source. The media data stream is converted into the desired format to form a formatted media data stream. The formatted media data stream is then stored on a storage media.

34 Claims, 5 Drawing Sheets

1. 5:00 a.m.  6:00 a.m.  www.IBM.com —642   MP3   CDR    D:
2. 7:30 p.m.  8:15 p.m.  www.new.IBM —644   MP3   CDR    E:/music
3. 7:30 p.m.  8:00 p.m.  www.sports.com —646  MPEG  8:01 p.m.  E:/new

FIG. 7

STREAMING INTERNET MEDIA RECORD AND PLAYBACK SOFTWARE PROGRAM

BACKGROUND OF THE INVENTION

1. Technical Field

The present invention relates generally to an improved data processing system, and in particular, to a method and apparatus for managing data streams. Still more particularly, the present invention provides a method and apparatus for managing the recording and play back of media data streams.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by the HTML document format on the Web was too limited. Other types of format received by users on the Web include audio and video broadcasts. Browsers currently include media players, which may be added as plug-ins to provide for the play back of these types of broadcasts. A plug-in is an auxiliary program that works with a major software package to enhance its capability. For example, plug-ins are widely used in image editing programs such as Photoshop to add a filter for some special effect. Plug-ins are added to Web browsers to enable them to support new types of content, such as audio and video.

Currently, media players do not provide an ability to later play back one time events broadcast over the Internet, such as a news program, when the source of the event does not provide a saved version of the event for users to play at a later time. In some cases, the event may only be available for a short period of time. When a user attempts to replay the event, the event may no longer be available. A user may be able to replay an event by searching through temporary Internet files if available. In some cases, the user may not be able to find the event if the temporary Internet files have been cleared. Additionally, a user would have to restore or move the file, once the user finds the file, to another location for more persistent storage of the event. Such a process is tedious and requires a user to have some knowledge of the file system and directory structures of the operating system.

Additionally, the formatted media broadcast over the Internet varies depending on the source. For example, for video, Moving Pictures Experts Group-2 (MPEG-2), MPEG-4, and Motion Joint Photographic Experts Group (M-JPEG), RealVideo, and Audio Video Interleaved (AVI) are some formats in which video is broadcast over the Internet. For audio only, MPEG Audio Layer 3 (MP3) and RealAudio are examples of some formats in which audio, such as music, is broadcast over the Internet. Currently, a user is required to have an appropriate media player for each of the formats that may be received. The operating system on a data processing system associates a file type with a particular media player or plug-in. In this manner, the user does not have to select a program or player each time a different type of format is received in a media data stream broadcast over the Internet. This, however, requires the user to have each of the media players or plug-ins required for each format.

Therefore, it would be advantageous to have an improved method and apparatus for receiving and capturing media streams broadcast over the Internet.

SUMMARY OF THE INVENTION

The present invention provides a method, apparatus, and computer instructions for managing streaming media data. A graphical user interface having a set of controls for use in managing a media data stream is presented. User input is received for use in managing the media data stream in which the user input includes an identification of a source of the media data stream, a start time, and a desired format. The media data stream is requested using the start time and the identification of the source. The media data stream is converted into the desired format to form a formatted media data stream. The formatted media data stream is then stored on a storage media.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
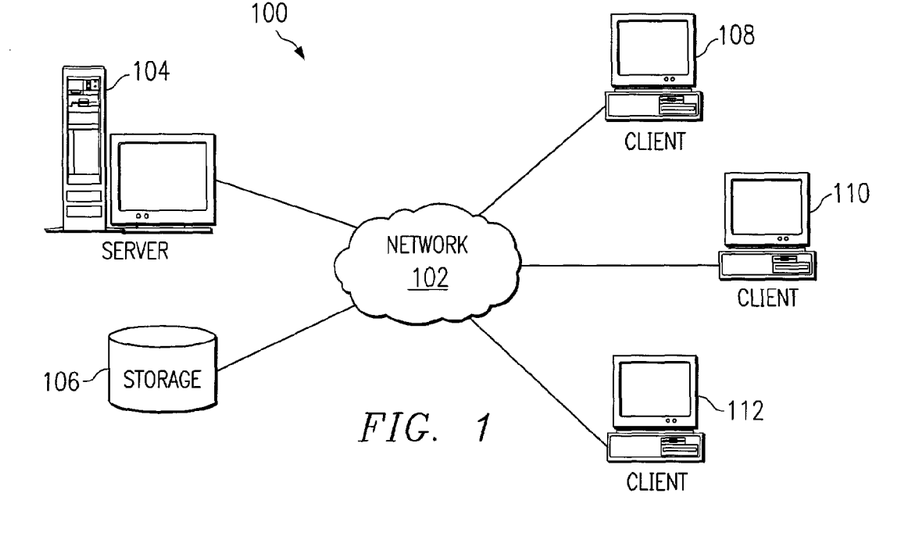
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, media data streams, and applications to clients 108-112. Clients 108, 110, and 112 are clients to server 104. In these examples, the clients may receive various media data streams, such as video and audio data streams for presentation at the clients.

Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
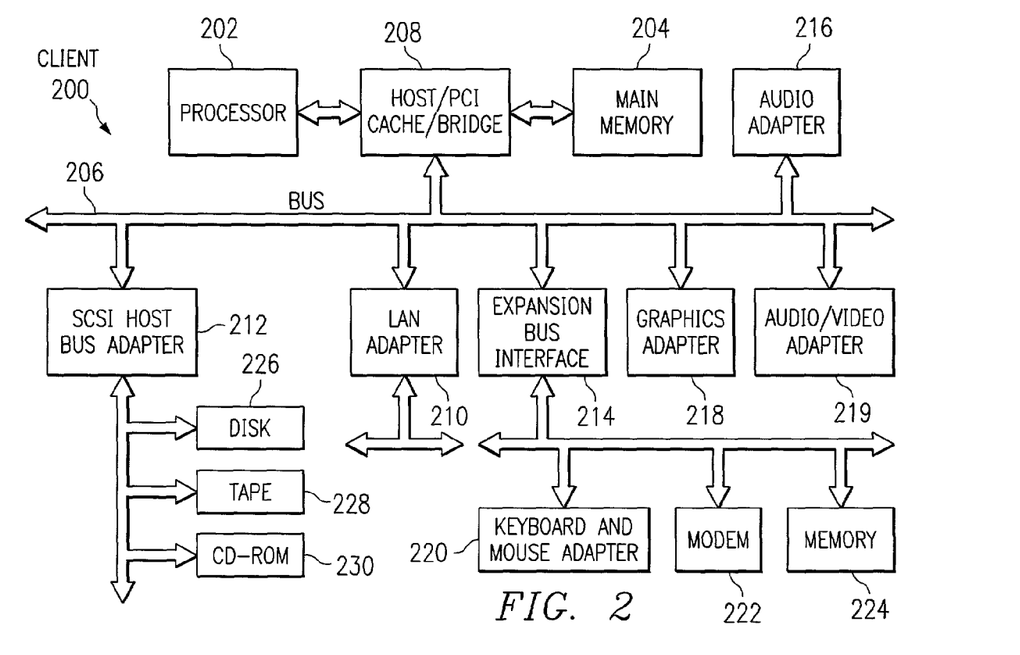
FIG. 2 is a block diagram of a data processing system in which the present invention may be implemented.

With reference now to FIG. 2, a block diagram of a data processing system is shown in which the present invention may be implemented. A media management system may be implemented within data processing system 200 to handle and manage various data streams, which may be received at data processing system 200.

Data processing system 200 is an example of a computer, such as client 108 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

The mechanism of the present invention provides an improved method, apparatus, and computer instructions for capturing streaming media content from Internet sources for storage and later play back. This mechanism solves problems associated with broadcasting of one time events over the Internet, such as news programs or other announcements, in which the source does not provide a saved version on the server for users to play back at a later time. The mechanism of the present invention also provides a graphical user interface to allow a user to specify preferences, such as the universal resource locator (URL) from which the media data stream is to be broadcast as well as start and stop times for recording. Additionally, the mechanism of the present invention provides for storing the media data stream in a format for storage and replay at a later time. Such a feature is especially useful when the format provided by the source is not one that can be directly replayed from a saved file. Further, this feature also allows for standardization or a common format from which the user may later play back saved media data streams.

Figure 3:
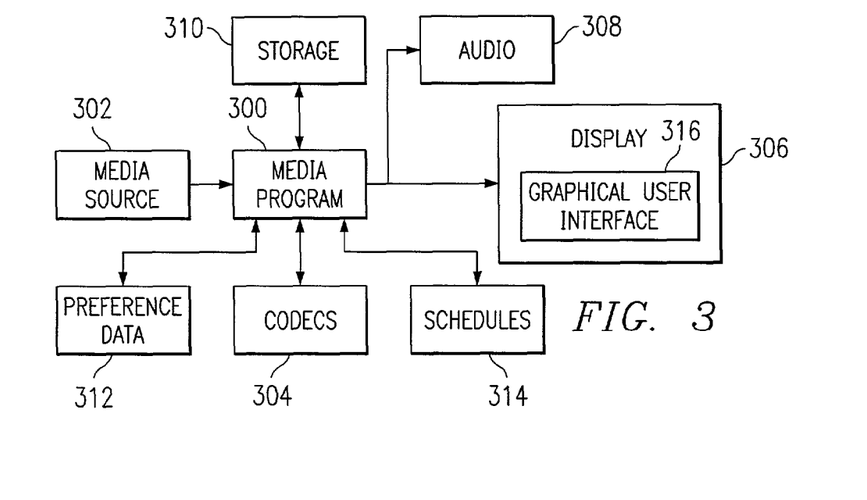
FIG. 3 is a diagram illustrating components used in managing media data streams in accordance with a preferred embodiment of the present invention.

Turning next to FIG. 3, a diagram illustrating components used in managing media data streams is depicted in accordance with a preferred embodiment of the present invention. Media program 300 may receive media data streams for media source 302. Media source 302 may be, for example, a server, such as server 104 in FIG. 1. Media program 300 may be located in a client, such as data processing system 200 in FIG. 2. The media stream may be converted from the source format into a viewable format using a codec from codecs 304 for presentation. A codec is hardware or software that converts analog sound, speech or video to digital code and vice versa (analog to digital—digital to analog). Software codecs are installed into audio and video editing programs as well as media players that download audio and video over the Web. In these examples, codecs 304 contains the necessary codecs to convert different types of media data streams that may be received by media program 300. Typically, a media data stream may be video or audio in which the video also may include audio components. Examples of media data streams include MPEG-2, MPEG-1, Cinepak, Indeo, AVI, MP3, RealVideo, and RealAudio. When a data stream is received by media program 300, the type of data is identified and the appropriate codec is selected from codecs 304 based on that identification. Typically, media data streams will include an identification of the format type. The viewable format as used herein is the format used by the operating system for presenting video or audio data on display 306 or audio 308. Display 306 may be, for example, a flat screen monitor or a projector, while audio 308 may be, for example, a speaker system or a set of headphones.

Media program 300 may store received media data streams in storage 310. In these examples, the media data stream is converted into a desired format or set of formats, which may be selected by the user. The identification of these formats may be located in preference data 312. Further, the media data stream may be stored in a storage device or location based on a user preference, which also may be found in preference data 312. In this manner, a user may store media data streams, such as music in various locations. These locations include, for example, a hard disk drive, a recordable compact disc, a re-writable compact disc, a floppy disk, memory stick, and a flash memory. A flash memory is a memory chip that can be rewritten and hold its content without power. It is also called a "flash RAM" or "flash ROM" chip and is widely used for digital camera film and as storage for many consumer and industrial applications. A memory stick is a type of flash memory. The location of these devices may be in the same data processing system as media program 300 or possibly in a remote device, such as a memory in a MP3 player.

Media program 300 also allows a user to program entries to record events. This feature is especially useful for live broadcasts in which the user may be unavailable to view or listen to the broadcasts when they occur. These entries are stored in schedules 314. The user will typically enter information, such as a start and stop time, a universal resource locator (URL), a format for the stored media data stream, a location in which the media data stream is to be stored, and optionally a user identification and password if required to access the event. Media program 300 uses these entries to request the media data streams and store them for the user. The user may interact with media program 300 through graphical user interface 316 presented on display 306. Examples of graphical user interface 316 are described with respect to FIGS. 5A-5B and 6A-6C described below. In this example, media program 300, preference data 312, schedules 314, and codecs 304 form a media management system through which a user may manage the recording and play back of media data streams.

Figure 4:
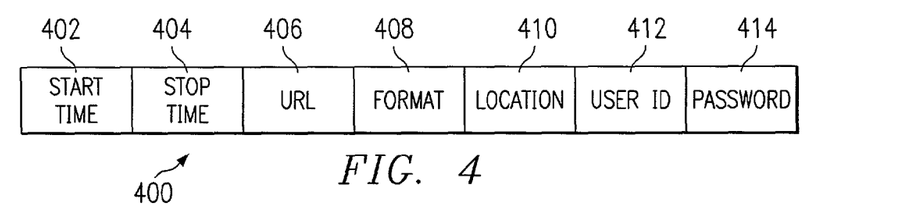
FIG. 4 is a diagram illustrating an entry in a schedule in accordance with a preferred embodiment of the present invention.

With reference now to FIG. 4, a diagram illustrating an entry in a schedule is depicted in accordance with a preferred embodiment of the present invention. Entry 400 is an example of an entry that may be found in schedules 314 in FIG. 3. In this example, entry 400 includes start time 402, stop time 404, URL 406, format 408, location 410, and optionally user id 412 and password 414. Start time 402 includes a time and date at which the media data stream should be recorded. Stop time 404 identifies when recording of the media data stream should terminate. URL 406 is used by the media program to request the media data stream from a source. Format 408 identifies the format in which the media data stream is to be stored. The user may select a format, such as audio only. In such an instance, if the media data stream is a video data stream including audio, only the audio component will be stored for the user. Location 410 identifies the location in which the media data stream is to be stored. For example, a user may indicate that the media data stream is to be stored on a recordable compact disc by indicating a drive letter for the device containing the recordable compact disc.

A user ID may be included in user ID 412 along with a password in password 414 for instances in which a user ID and password are required to access the particular media data stream.

Figure 5A:
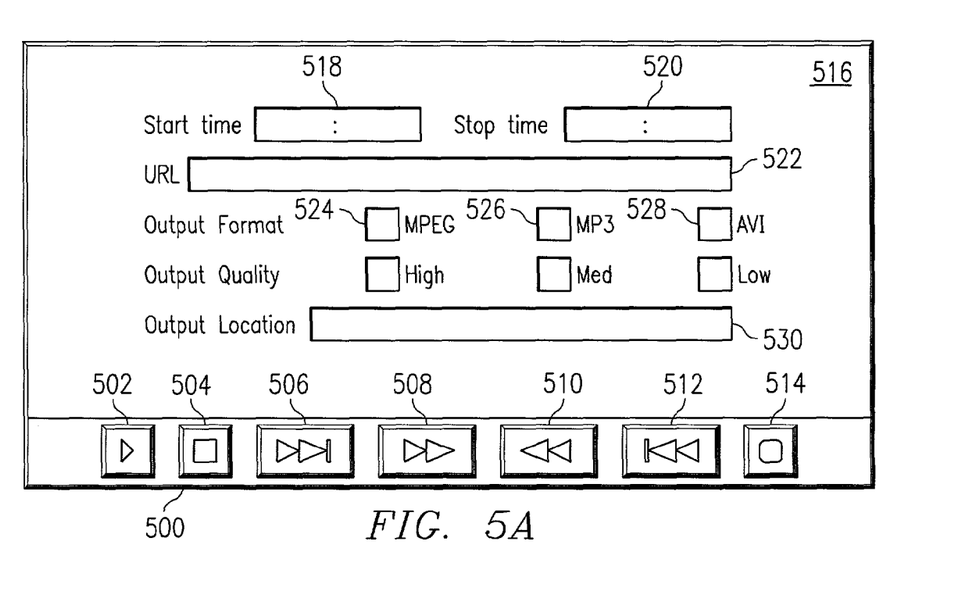
FIGS. 5A and 5B are diagrams illustrating a graphical user interface (GUI) for a media management system in accordance with a preferred embodiment of the present invention.
Figure 5B:
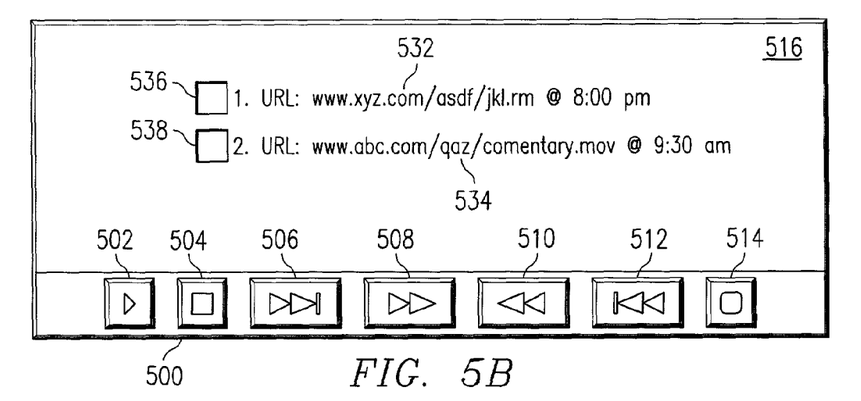

Turning next to FIGS. 5A and 5B, diagrams illustrating a graphical user interface (GUI) for a media management system are depicted in accordance with a preferred embodiment of the present invention. The graphical user interface illustrated in these examples may be implemented as GUI 316 in FIG. 3.

As illustrated in FIG. 5A, GUI 500 provides a set of controls, which may be manipulated by the user with a pointing device, such as a mouse or trackball. These controls include play button 502, stop button 504, end-of-file button 506, fast forward button 508, rewind button 510, beginning-of-file button 512, and record button 514. Play button 502 allows for a media data stream to be presented to the user either visually, audibly, or a combination of the two. Stop button 504 is used to halt presentation of a media data stream. End-of-file button 506 moves the presentation to the end of the file while beginning-of-file button 512 moves the presentation to the beginning of the file containing the media data stream. Rewind button 510 and fast forward button 508 may be selected by the user to fast forward or rewind the presentation in a fashion similar to the functions found on a video cassette recorder or a digital versatile disc (DVD) player.

Record button 514 may be used to initiate recording of a media data stream. In this example, selection of record button 514 results in user input field 516 being displayed within GUI 500. A start time may be entered in field 518 with a stop time being entered in field 520. The source of the media data stream may be identified in field 522 in which a URL is entered. The output format may be selected by the user through checkboxes 524, 526, and 528. In this example, checkbox 524 is used to select an MPEG format, checkbox 526 is used to select an MP3 format, and checkbox 528 is used to select an AVI format. Of course, other formats may be used depending on the preferences set by the user. These checkboxes are presented as a result of preferences previously selected by the user as formats for storing media data streams. The location in which the media data stream is to be stored may be identified in field 530.

If the user selects checkbox 526 for an MP3 format and the media data stream is in an MPEG format, the mechanism of the present invention will save the media data stream in an MP3 format even though the original format is an MPEG format. Specifically, the audio portion of the MPEG data will be stripped out for use in generating the MP3 data. A user may desire only to hear the audio portions of an event based on the player, which is used for play back such as an MP3 player.

In FIG. 5B, GUI 500 presents selections for replay to a user within user input field 516. In this example, selections 532 and 534 are presented to the user. A selection may be selected through checkbox 536 or checkbox 538 in these examples. Once a selection has been made, manipulation of play button 502 results in the media data stream being presented to the user.

Figure 6A:
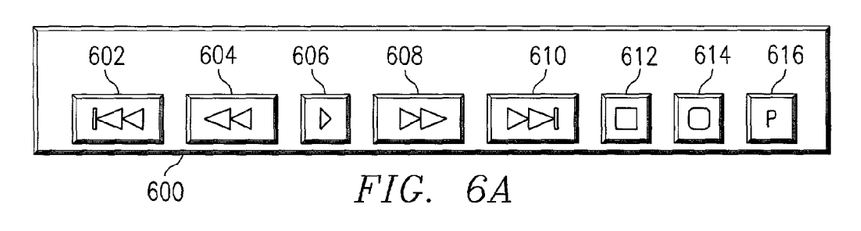
FIGS. 6A-6C are diagrams illustrating another embodiment for a graphical user interface for a media management system in accordance with a preferred embodiment of the present invention.
Figure 6B:
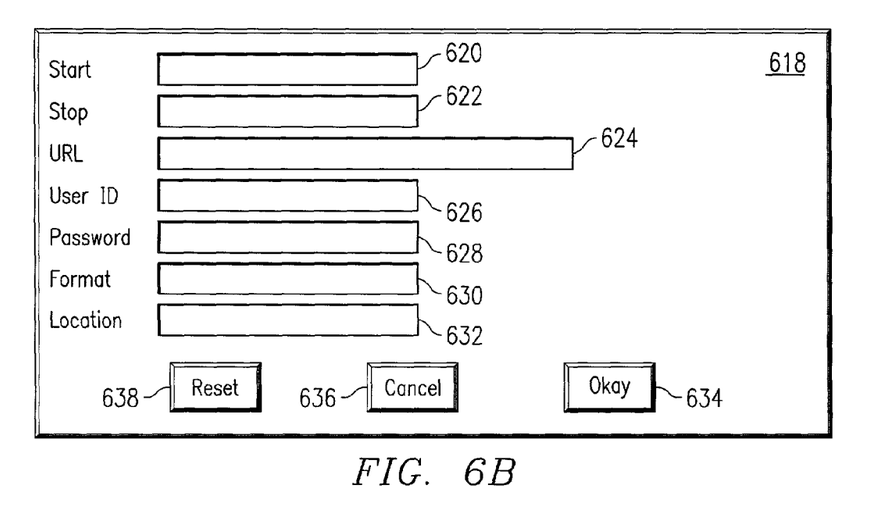
Figure 6C:
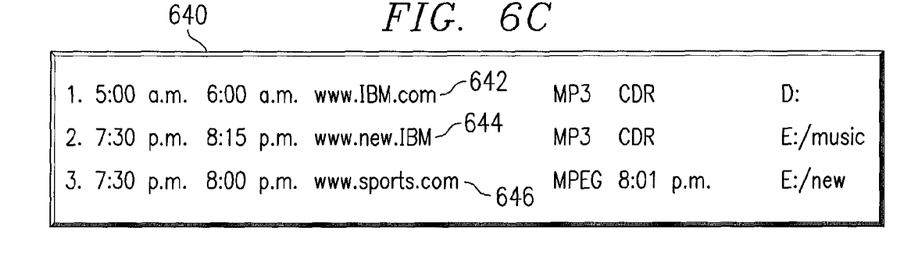

Turning next to FIGS. 6A-6C, diagrams illustrating another embodiment for a graphical user interface for a media management system are depicted in accordance with a preferred embodiment of the present invention. In FIG. 6A, GUI 600 includes beginning-of-file button 602, rewind button 604, play button 606, fast forward button 608, end-of-file button 610, stop button 612, record button 614, and program button 616. These buttons perform functions similar to those described with respect to the set of buttons in GUI 500 in FIG. 5, with the exception of record button 614 and program button 616.

In this example, record button 614 provides for recording of a media stream currently being presented within a data processing system while program button 616 allows a user to schedule or generate entries to record events. Selection of record button 614 initiates recording of media data stream currently being presented. The media data stream is converted into a format previously selected by the user and stored in a location previously selected by the user.

A selection of program button 616 results in screen 618 being presented to the user in FIG. 6B. This screen allows a user to generate an entry for a schedule, such as schedules 314 in FIG. 3. As depicted screen 618 includes start field 620, stop field 622, URL field 624, user identification field 626, password field 628, format field 630, and location field 632.

Start field 620 is used to set a start time and date for recording a media data stream. Stop field 622 is used to set the time and date at which recording of the media data stream finishes. URL field 624 is used to identify the source of the media data stream. Further, the user may optionally include a user ID and password in user identification field 626 and password field 628. Format field 630 is used to set the format in which the media data stream will be stored. The location for storing the media data stream is set using location field 632.

After the user has finished entering information in screen 618, a selection of okay button 634 results in the information entered in screen 618 being placed into an entry for a schedule. If the user does not want to create an entry, the user may select cancel button 636, which results in screen 618 being removed from display without creating an entry. If the user wishes to start over in entering information, the fields may be cleared by selecting reset button 638.

After selecting okay button 634, screen 640 in FIG. 6C is displayed to the user to present entries in the schedule. In this example, screen 640 includes entries 642, 644, and 646. Each entry provides a start time, a stop time, a URL, a format, and a location. The user may select an entry for editing or delete an entry from screen 640. Selection of an entry for editing may be made by a selected user input, such as a double click on the entry. Such a selection results in screen 618 being displayed to the user with the information in the appropriate fields for editing or changes.

The graphical user interfaces presented in 5A-5C and 6A-6C are for purposes of illustration and not intended to limit the manner in which a graphical user interface may be designed for managing media data streams. For example, both GUIs provided for entering data in fields. Alternatively, each field may include a control to present a drop down menu of choices from which a user may select a particular entry for a field.

Figure 7:
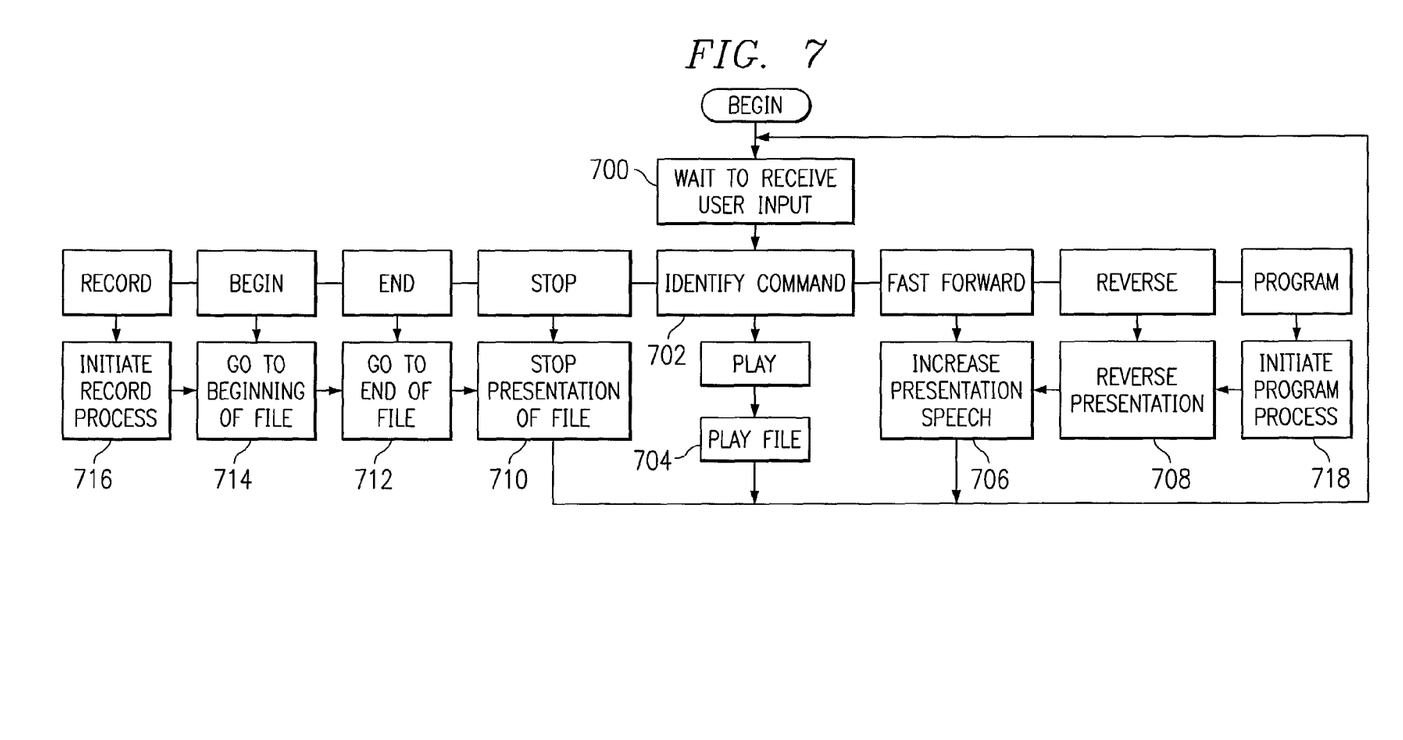
FIG. 7 is a flowchart of a process used for handling user input to a graphical user interface in a media management system in accordance with a preferred embodiment of the present invention.

With reference now to FIG. 7, a flowchart of a process used for handling user input to a graphical user interface in a media management system is depicted in accordance with a preferred embodiment of the present invention. The process illustrated in FIG. 7 may be implemented in a media program, such as media program 300 in FIG. 3.

The process begins by waiting for receipt of a user input (step 700). The user input in these examples is one made to a graphical user interface, such as GUI 500 in FIG. 5A or GUI 600 in FIG. 6A. Upon receiving a user input, the command input by the user is identified (step 702). If the command is play, the file is played (step 704) with the process then returning to step 700 to receive another user input. Upon identifying the user input as a fast forward command, the speed at which the presentation is presented is increased to generate a fast forward effect (step 706) with the process then returning to step 700. If the command identified in step 702 is a reverse command, the presentation is reversed (step 708) with the process then returning to step 700.

If the user input is a stop command, the presentation of the file is halted (step 710) with the process then returning to step 700. Receipt of an end-of-file command results in the program going to the end of the file (step 712) with the process returning to step 700. A beginning-of-file command results in the program going to the beginning of the file (step 714) with the process returning to step 700.

If a record command is identified for the user input, a record process is initialized (step 716) with the process returning to step 700. This record process is described in more detail in FIG. 9 below. An identification of the user input as being a program command results in initialization of a program process to generate an entry for a schedule (step 718) with the process returning to step 700. This program process is described in more detail in FIG. 8 below.

Figure 8:
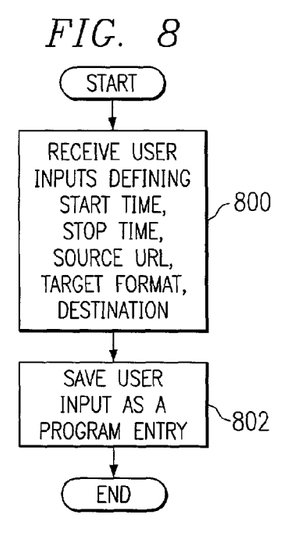
FIG. 8 is a flowchart of a process used for generating a program entry in accordance with a preferred embodiment of the present invention.

Turning now to FIG. 8, a flowchart of a process used for generating a program entry is depicted in accordance with a preferred embodiment of the present invention. The process illustrated in FIG. 8 may be implemented in a media program, such as media program 300 in FIG. 3. This process is a more detailed of illustration of step 718 in FIG. 7.

The process begins by receiving user inputs defining start time, stop time, source URL, target format, and destination (step 800). These different user inputs are received through a graphical user interface, such as GUI 500 in FIG. 5A or screen 618 in FIG. 6B. Next, the user input is saved as a program entry (step 802) with the process terminating thereafter. The program entry may be stored in a scheduling system, such as schedules 314 in FIG. 3.

Figure 9:
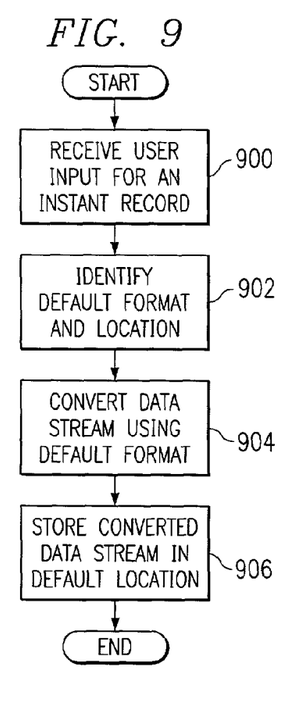
FIG. 9 is a flowchart of a process used for recording a media stream in accordance with a preferred embodiment of the present invention.

With reference now to FIG. 9, a flowchart of a process used for recording a media stream is depicted in accordance with a preferred embodiment of the present invention. The process illustrated in FIG. 9 may be implemented in a media program, such as media program 300 in FIG. 3. The process illustrated in this figure is a more detailed description of step 716 in FIG. 7.

This process is used to record a media data stream being presented to a user. The process begins by receiving user input for an instant record (step 900). The default format and location are identified (step 902). This default information may be identified from preference data, such as preference data 312 in FIG. 3. The data stream is converted using default format (step 904). Next, the converted data stream is stored in the default location (step 906) with the process terminating thereafter.

Figure 10:
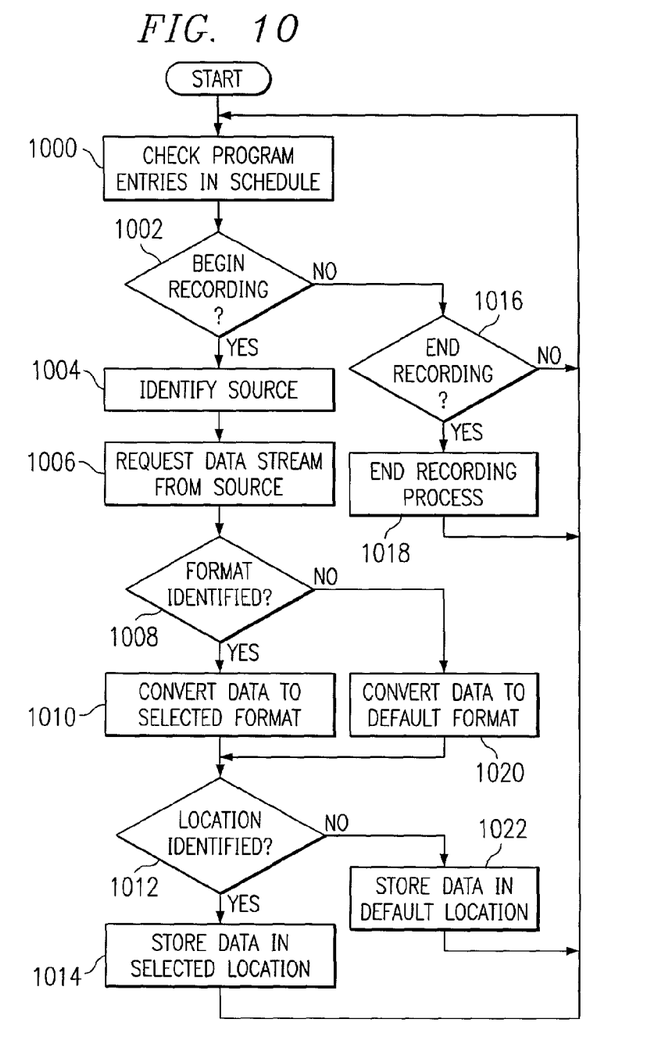
FIG. 10 is a flowchart of a process used for recording media data streams using a schedule in accordance with a preferred embodiment of the present invention.

Turning next to FIG. 10, a flowchart of a process used for recording media data streams using a schedule is depicted in accordance with a preferred embodiment of the present invention. The process illustrated in FIG. 10 may be implemented in a media program, such as media program 300 in FIG. 3.

The process begins by checking program entries in a schedule, such as schedules 314 in FIG. 3 (step 1000). Next, a determination is made as to whether to begin recording (step 1002). This determination is made by comparing the current time to the start time in each entry in the schedule. If recording is to begin, a source is identified (step 1004). The data stream is requested from the source (step 1006). Depending on the start times, multiple data streams may be requested at the same time if multiple entries have the same start time.

Next, a determination is made as to whether the format has been identified (step 1008). If a format has been identified, the data is converted to the selected format (step 1010). This conversion is made using an appropriate codec in these examples. This conversion may include directly converting the media data stream into the desired format selected by the user. Alternatively, the media data stream may be converted into a viewable format for presentation by the operating system and then from the viewable format to the desired format. Additionally, a determination is made as to whether a location has been identified (step 1012). If a location has been identified, the data is stored in the selected location (step 1014) with the process returning to step 1000 as described above. As previously mentioned, this location may be local within the data processing system or another device in communication with a data processing system, such as an MP3 player.

With reference again to step 1012, if a location is not identified, the data is stored in the default location (step 1022). This default location may be determined from preference data, such as preference data 312 in FIG. 3. The process then returns to step 1000 as described above. Turning again to step 1008, if a format has not been identified, the data is converted to the default format using preference data (step 1020) with the process then proceeding to step 1012 as described above.

With reference again to step 1002, if recording is not to begin, a determination is made as to whether the recording should end (step 1016). If recording of the media data stream is not to end, the process returns to step 1000. This may result if recording has not begun or if the recording of the media data stream has not reached the stop time for the entry. If the recording of the media data stream is to end, the recording process is terminated (step 1018) and the process returns to step 1000, as described above.

As an additional feature, the user may be notified when recording of an event has completed. This notification may take different forms depending on the particular implementation. For example, an email message, a voice mail message, or a pager message may be sent to indicate that the recording has completed. Further, such messages may be sent to indicate the initiation of the recording of an event.

Thus, the present invention provides an improved method, apparatus, and computer instructions for managing the recording and play back of media data streams over the Internet. This mechanism avoids the need for having multiple media players in a data processing system. Further, the mechanism of the present invention allows for live or one time broadcasts to be recorded for later play back. Also provided is a graphical user interface, which allows for easier management and manipulation of media data streams stored in files. The ability to store data streams in a location of a user's choice avoids having a user look for and move files after they have been recorded. With the mechanism of the present invention, different future broadcasts and media storage formats may be easily accommodated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing streaming media data, the method comprising:
    presenting a graphical user interface having a set of controls for use in managing a media data stream, wherein the graphical user interface includes a control to select a desired format for storing the media data stream;
    receiving user input for use in managing the media data stream, wherein the user input includes an identification of a source of the media data stream, a start time, and the desired format;
    requesting the media data stream using the start time and the identification of the source;
    converting the media data stream into the desired format to form a formatted media data stream, wherein the converting step comprises identifying an initial format of the media data stream, converting the media data stream to a viewable format, and converting the media data stream to the desired format from the viewable format, wherein the viewable format is a format displayable by an operating system in the data processing system, wherein a set of codecs are used to convert the media data stream from the initial format to the viewable format and to convert the media data stream from the viewable format to the desired format, and wherein a data type of the media data stream is identified by the data processing system upon receipt of the media data stream at the data processing system, and an appropriate codec is selected from amongst a plurality of codecs for use in converting the media data stream from the initial format to the viewable format based upon the data type that is identified by the data processing system; and
    storing, on a storage media, the media data stream converted to the desired format such that the media data stream is converted to the viewable format by the data processing system based on the data type of the media data stream as identified by the data processing system and stored on the storage media in the desired format as identified by the user input.

2. The method of claim 1, wherein the user input includes an identification of a location of the media.

3. The method of claim 1, wherein the storage media is at least one of a hard disk drive, a recordable compact disc, a re-writable compact disc, a floppy disk, memory stick, and a flash memory.

4. The method of claim 1, wherein the identification of the source is a universal resource locator.

5. The method of claim 1, wherein the user input further includes a user identification and a password.

6. The method of claim 1, wherein the requesting step includes using the user identification and the password to request the media data stream.

7. The method of claim 1, wherein the desired format is an audio format and the media data stream includes video and audio and further comprising:
    converting only audio portions of the media data stream into the audio format.

8. The method of claim 7, wherein the audio format is a Moving Pictures Expert Group audio layer 3 format.

9. The method of claim 1, wherein the media data stream is a live broadcast of an event.

10. The method of claim 1, wherein the set of controls includes a play button, a record button, a fast forward button, and a rewind button.

11. The method of claim 1, wherein the user input is received in at least one input screen.

12. The method of claim 1, wherein the graphical user interface further includes a control to select a location to store the media data stream.

13. A method in a data processing system for managing streaming media data, the method comprising:
    presenting a graphical user interface having a set of controls for use in managing a media data stream, wherein the set of controls includes a first control used to select a format for storing the media data stream and a second control used to select a location to store the media data stream;
    receiving user input selecting the format and the location;
    responsive to receiving the media data stream, converting the media data stream into the format to form a formatted media data stream, wherein the converting step comprises identifying an initial format of the media data stream, converting the media data stream to a viewable format, and converting the media data stream to the desired format from the viewable format, wherein the viewable format is a format displayable by an operating system in the data processing system, wherein a set of codecs are used to convert the media data stream from the initial format to the viewable format and to convert the media data stream from the viewable format to the desired format, and wherein a data type of the media data stream is identified by the data processing system upon receipt of the media data stream at the data processing system, and an appropriate codec is selected from amongst a plurality of codecs for use in converting the media data stream from the initial format to the viewable format based upon the data type that is identified by the data processing system; and
    storing, in the location, the media data stream converted to the desired format such that the media data stream is converted to the viewable format by the data processing system based on the data type of the media data stream as identified by the data processing system and stored on the storage media in the desired format as identified by the user input.

14. The method of claim 13, wherein the location is one of a hard disk drive, a recordable compact disc, a re-writable compact disc, a floppy disk, memory stick, and a flash memory.

15. The method of claim 13, wherein the format is MPEG or MP3.

16. A data processing system for managing streaming media data, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to present a graphical user interface having a set of controls for use in managing a media data stream, wherein the graphical user interface includes a control to select a desired format for storing the media data stream; receive user input for use in managing the media data stream in which the user input includes an identification of a source of the media data stream, a start time, and the desired format;

request the media data stream using the start time and the identification of the source; convert the media data stream into the desired format to form a formatted media data stream by identifying an initial format of the media data stream, converting the media data stream to a viewable format, and converting the media data stream to the desired format from the viewable format, wherein a set of codecs are used to convert the media data stream from the initial format to the viewable format and to convert the media data stream from the viewable format to the desired format, wherein the viewable format is a format displayable by an operating system in the data processing system, and wherein a data type of the media data stream is identified by the data processing system upon receipt of the media data stream at the data processing system, and an appropriate codec is selected from amongst a plurality of codecs for use in converting the media data stream from the initial format to the viewable format based upon the data type that is identified by the data processing system; and store on a storage media the media data stream converted to the desired format such that the media data stream is converted to the viewable format by the data processing system based on the data type of the media data stream as identified by the data processing system and stored on the storage media in the desired format as identified by the user input.

17. A data processing system for managing streaming media data, the data processing system comprising:
a bus system;
a communications unit connected to the bus system;
a memory connected to the bus system, wherein the memory includes a set of instructions; and
a processing unit connected to the bus system, wherein the processing unit executes the set of instructions to present a graphical user interface having a set of controls for use in managing a media data stream in which the set of controls includes a first control used to select a format for storing the media data stream and a second control used to select a location to store the media data stream; receive user input selecting the format and the location; convert the media data stream into the format to form a formatted media data stream in response to receiving the media data stream by identifying an initial format of the media data stream, converting the media data stream to a viewable format, and converting the media data stream to the desired format from the viewable format, wherein the viewable format is a format displayable by an operating system in the data processing system, wherein a set of codecs are used to convert the media data stream from the initial format to the viewable format and to convert the media data stream from the viewable format to the desired format, and wherein a data type of the media data stream is identified by the data processing system upon receipt of the media data stream at the data processing system, and an appropriate codec is selected from amongst a plurality of codecs for use in converting the media data stream from the initial format to the viewable format based upon the data type that is identified by the data processing system; and store in the location the media data stream converted to the desired format such that the media data stream is converted to the viewable format by the data processing system based on the data type of the media data stream as identified by the data processing system and stored on the storage media in the desired format as identified by the user input.

18. A data processing system for managing streaming media data, the data processing system comprising:

presenting means for presenting a graphical user interface having a set of controls for use in managing a media data stream, wherein the graphical user interface includes a control to select a desired format for storing the media data stream;
receiving means for receiving user input for use in managing the media data stream, wherein the user input includes an identification of a source of the media data stream, a start time, and the desired format;
requesting means for requesting the media data stream using the start time and the identification of the source;
converting means for converting the media data stream into the desired format to form a formatted media data stream, wherein the converting means comprises identifying means for identifying an initial format of the media data stream, first converting means for converting the media data stream to a viewable format, and second converting means for converting the media data stream to the desired format from the viewable format, wherein the viewable format is a format displayable by an operating system in the data processing system, wherein a set of codecs are used to convert the media data stream from the initial format to the viewable format and to convert the media data stream from the viewable format to the desired format, and wherein a data type of the media data stream is identified by the data processing system upon receipt of the media data stream at the data processing system, and an appropriate codec is selected from amongst a plurality of codecs for use in converting the media data stream from the initial format to the viewable format based upon the data type that is identified by the data processing system; and
storing means for storing on a storage media the media data stream converted to the desired format such that the media data stream is converted to the viewable format by the data processing system based on the data type of the media data stream as identified by the data processing system and stored on the storage media in the desired format as identified by the user input.

19. The data processing system of claim 18, wherein the user input includes an identification of a location of the media.

20. The data processing system of claim 18, wherein the storage media is at least one of a hard disk drive, a recordable compact disc, a re-writable compact disc, a floppy disk, memory stick, and a flash memory.

21. The data processing system of claim 18, wherein the identification of the source is a universal resource locator.

22. The data processing system of claim 18, wherein the user input further includes a user identification and a password.

23. The data processing system of claim 18, wherein the requesting means includes using the user identification and the password to request the media data stream.

24. The data processing system of claim 18, wherein the desired format is an audio format and the media data stream includes video and audio and wherein the converting means further comprises:
converting means for converting only audio portions of the media data stream into the audio format.

25. The data processing system of claim 24, wherein the audio format is a Moving Pictures Expert Group audio layer 3 format.

26. The data processing system of claim 18, wherein the media data stream is a live broadcast of an event.

27. The data processing system of claim 18, wherein the set of controls includes a play button, a record button, a fast forward button, and a rewind button.

28. The data processing system of claim 18, wherein the user input is received in at least one input screen.

29. The data processing system of claim 18, wherein the graphical user interface further includes a control to select a location to store the media data stream.

30. A data processing system for managing streaming media data, the data processing system comprising:
presenting means for presenting a graphical user interface having a set of controls for use in managing a media data stream, wherein the set of controls includes a first control used to select a format for storing the media data stream and a second control used to select a location to store the media data stream;
receiving means for receiving user input selecting the format and the location;
converting means, responsive to receiving the media data stream, for converting the media data stream into the format to form a formatted media data stream, wherein the converting means comprises identifying means for identifying an initial format of the media data stream, first converting means for converting the media data stream to a viewable format, and second converting means for converting the media data stream to the desired format from the viewable format, wherein the viewable format is a format displayable by an operating system in the data processing system, wherein a set of codecs are used to convert the media data stream from the initial format to the viewable format and to convert the media data stream from the viewable format to the desired format, and wherein a data type of the media data stream is identified by the data processing system upon receipt of the media data stream at the data processing system, and an appropriate codec is selected from amongst a plurality of codecs for use in converting the media data stream from the initial format to the viewable format based upon the data type that is identified by the data processing system; and
storing means for storing, in the location, the media data stream converted to the desired format such that the media data stream is converted to the viewable format by the data processing system based on the data type of the media data stream as identified by the data processing system and stored on the storage media in the desired format as identified by the user input.

31. The data processing system of claim 30, wherein the location is one of a hard disk drive, a recordable compact disc, a re-writable compact disc, a floppy disk, memory stick, and a flash memory.

32. The data processing system of claim 30, wherein the format is MPEG or MP3.

33. A computer program product in a computer storage medium for managing streaming media data, the computer program product comprising:
first instructions for presenting a graphical user interface having a set of controls for use in managing a media data stream, wherein the graphical user interface includes a control to select a desired format for storing the media data stream;
second instructions for receiving user input for use in managing the media data stream, wherein the user input includes an identification of a source of the media data stream, a start time, and the desired format;
third instructions for requesting the media data stream using the start time and the identification of the source;
fourth instructions for converting the media data stream into the desired format to form a formatted media data stream by identifying an initial format of the media data stream, converting the media data stream to a viewable format, and converting the media data stream to the desired format from the viewable format, wherein the viewable format is a format displayable by an operating system in the data processing system, wherein a set of codecs are used to convert the media data stream from the initial format to the viewable format and to convert the media data stream from the viewable format to the desired format, and wherein a data type of the media data stream is identified by the data processing system upon receipt of the media data stream at the data processing system, and an appropriate codec is selected from amongst a plurality of codecs for use in converting the media data stream from the initial format to the viewable format based upon the data type that is identified by the data processing system; and
fifth instructions for storing on a storage media the media data stream converted to the desired format such that the media data stream is converted to the viewable format by the data processing system based on the data type of the media data stream as identified by the data processing system and stored on the storage media in the desired format as identified by the user input.

34. A computer program product in a computer storage medium for managing streaming media data, the computer program product comprising:
first instructions for presenting a graphical user interface having a set of controls for use in managing a media data stream, wherein the set of controls includes a first control used to select a format for storing the media data stream and a second control used to select a location to store the media data stream;
second instructions for receiving user input selecting the format and the location;
third instructions, responsive to receiving the media data stream, for converting the media data stream into the format to form a formatted media data stream by identifying an initial format of the media data stream, converting the media data stream to a viewable format, and converting the media data stream to the desired format from the viewable format, wherein the viewable format is a format displayable by an operating system in the data processing system, wherein a set of codecs are used to convert the media data stream from the initial format to the viewable format and to convert the media data stream from the viewable format to the desired format, and wherein a data type of the media data stream is identified by the data processing system upon receipt of the media data stream at the data processing system, and an appropriate codec is selected from amongst a plurality of codecs for use in converting the media data stream from the initial format to the viewable format based upon the data type that is identified by the data processing system; and
fourth instructions for storing, in the location, the formatted media data stream converted to the desired format such that the media data stream is converted to the viewable format by the data processing system based on the data type of the media data stream as identified by the data processing system and stored on the storage media in the desired format as identified by the user input.

* * * * *